Patented July 13, 1954

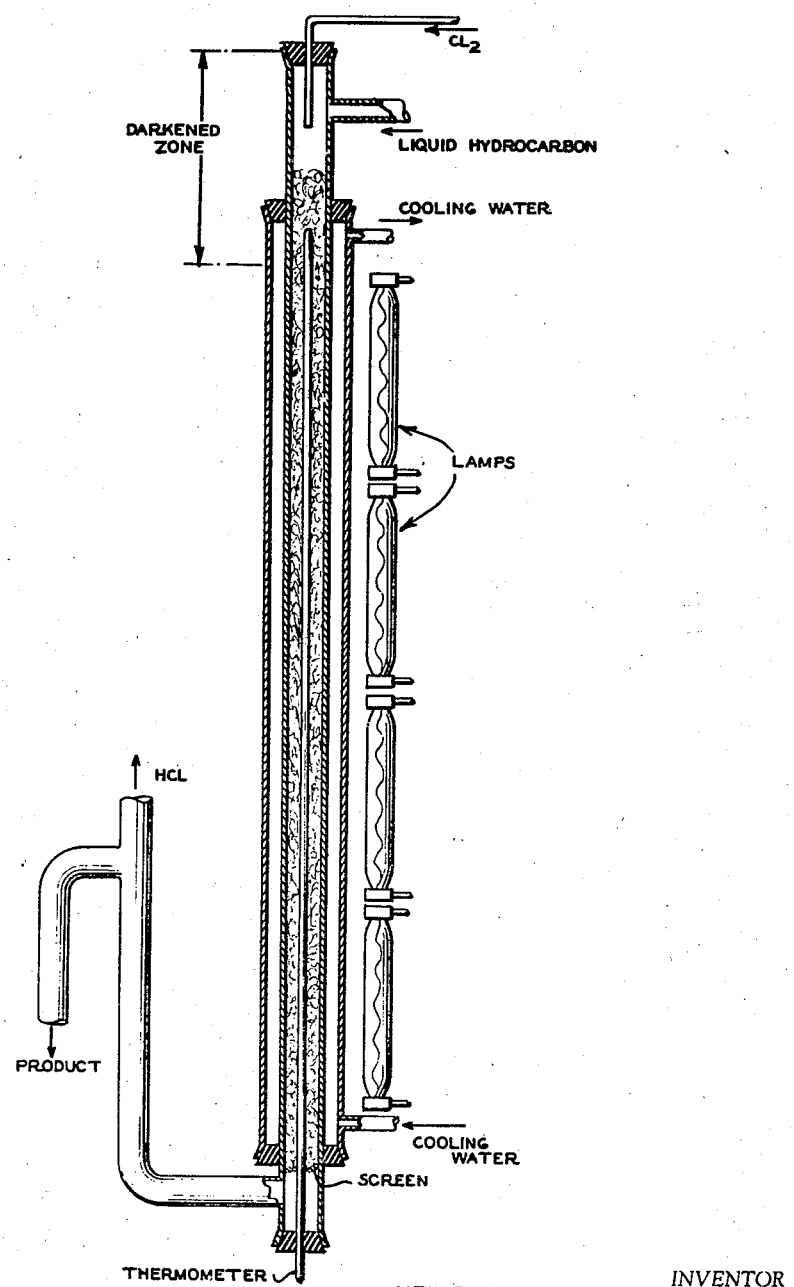

2,683,688

UNITED STATES PATENT OFFICE 2,683,688

PREPARATION OF ALKYL MONOCHLORIDES

Heinrich Tramm, Mulheim-Ruhr-Speldorf, and Nikolaus Geiser, Helmut Kolling, and Siegfried Puschhof, Duisburg-Hamborn, Germany, assignors to Ruhrchemie Aktiengesellschaft, Oberhausen-Holten, Germany, a German corporation Application March 6, 1951, Serial No. 216,112

Claims priority, application Germany March 6, 1950

7 Claims. (Cl. 204—163)

This invention relates to improvements in the preparation of alkyl monochlorides.

In the chlorination of hydrocarbons it is highly desirable for many purposes to obtain the highest possible yield of monochlorides. As is known, in the chlorination of hydrocarbons the percentage of monochlorides obtained in the chlorinated product increases when the quantity of chlorine added to each mol of hydrocarbon is reduced. The monochloride content, in reference to the total chloride content, reaches for example the following values:

| Addition of gram-atoms chlorine per mol of hydrocarbon | Monochloride content of the reaction product, mol percent |
|---|---|
| 0.1 | 96 |
| 0.2 | 90.5 |
| 0.3 | 86 |
| 0.5 | 77 |
| 1.0 | 58 |

As can be seen, in order to obtain a high yield of monochlorides, it is advisable to add by addition less than 0.3 gram-atom of chlorine to each mol of hydrocarbon.

When operating in this manner very large quantities of hydrocarbons must be passed through the chlorination. For this reason, the industrial operation of this reaction can be effected advantageously only in continuous operation.

It has been suggested to pass the hydrocarbon mixture and gaseous chlorine in parallel flow or preferably in counter-flow through vertical pipes of glass or quartz glass. This operation, however, has only a very low output, inasmuch as the liquid velocities used therein amount to only 0.1 cms./sec. when taking into consideration the quantities of gas which are present at the same time.

In other known chlorination methods the liquid products are pumped through a cooler and a reaction vessel in which a mercury vapor lamp is suspended. An aliquot portion of the liquid is continuously tapped off from the circuit and worked up. The capacity of this apparatus is very low, as a very high re-cycling ratio is generally used.

Aside from the extremely small output these conventional methods for continuous hydrocarbon chlorination have the further disadvantage in that they cannot reach the ratios of mono-polychlorides theoretically possible in a non-continuous chlorination. An undesired displacement of the ratio in the direction of the formation of polychlorides takes place.

Even when re-cycling the products in such a manner that the chlorine and hydrocarbons are introduced at the bottom end of a vertical glass tube and the reaction products are removed from the top, no substantial improvement in the yield is obtained.

One object of this invention is continuous hydrocarbon chlorination with an increased capacity and an increased yield of monochlorides. This and further objects will become apparent from the following description and the examples.

The accompanying figure illustrates an embodiment of an apparatus for effecting the reaction.

It has now been found that it is possible to practically obtain the theoretically possible yield of monochlorides and at the same time increase the capacity of the chlorination apparatus in a continuously carried out hydrocarbon chlorination, if the hydrocarbon which is to be chlorinated and the chlorine gas are passed in parallel flow downwards through an illuminated packed reaction tube with a liquid velocity in excess of 5 cms./sec. and preferably in excess of 10 cms./sec., not taking into consideration the quantities of gas also flowing through. The reaction tube may be vertical, inclined or horizontal. The reaction tube must be made of glass or some other material which is transparent to light. In order to remove the heat of reaction it is advantageous to provide the reaction tube with a cooling jacket. The tube should be arranged in such a manner that it can be readily and intensely illuminated, as for example, with mercury vapor lamps.

An embodiment of an apparatus for effecting the chlorination in accordance with the invention is diagrammatically shown in the drawing. The apparatus consists of a vertical glass tube provided with a glass cooling jacket. The interior of the vertical glass tube is filled with packing material such as filler consisting of glass or ceramic material. The filler material is retained on a screen positioned at the bottom of the vertical glass tube just above the outlet opening. The tube is provided with a thermometer which extends up the central axis thereof. A bank of lamps is positioned adjacent the outside of the cooling jacket for illuminating tube leaving a darkened zone at the upper portion. The chlorine and liquid hydrocarbon are passed into the upper portion of the vertical tube through the inlets indicated and the chlorinated product and hydrogen chloride are removed from the lower end of the vertical tube through the outlet as shown. Cooling water is circulated through the cooling jacket to maintain the temperature in the prescribed limits.

When proceeding according to the invention, the chlorine addition is preferably restricted to 0.1 to 0.3 gram-atoms of chlorine for each mol of hydrocarbon. The chlorine hydrocarbons formed are separated from the unreacted hydrocarbon after leaving the reaction tube by fractionation. The unreacted hydrocarbon is returned to be re-cycled. Care must be taken that the chlorine and the hydrocarbon are sufficiently throttled, so that the reaction can not back up. This can preferably be accomplished by having a sufficiently high preliminary pressure for both the reaction participants with suitable throttle valves arranged in the admission lines. In this way the reaction can be carried out in an absolutely uniform manner without exercising extremely careful operational supervision.

If the chlorination is carried out in vertical or slanted reaction tubes a liquid seal must be provided at the lower end of the tube in order to prevent the entire liquid from running out. Furthermore, the packing must be supported by a screen or grate positioned at the lower end of the tube, so that it will not be removed by the high flow velocity.

As the addition of chlorine to hydrocarbons is an exothermal reaction, care must be taken for the most rapid removal of the heat of reaction. This can be accomplished by providing large cooling surfaces and having a sufficient temperature difference between the cooling agent and the reaction tube. If possible, the reaction temperature should not exceed 70° C. inasmuch as the formation of polychlorides increases at higher temperatures. It has proven particularly advantageous to effect the reaction at 45 to 65° C.

Because of the parallel flow between the hydrocarbon and the chlorine gas, the actual velocities in the reaction tube are substantially greater than the pure liquid velocity inasmuch as the hydrochloride which is produced becomes mixed with the liquid chlorination products. Due to this the gaseous liquid reaction mixture has an actual velocity of about 2 to 6 m./sec. In the conventional procedure in vertical reaction tubes in which the chlorine was admitted from the bottom, the hydrocarbon formed was able to escape from the top and had no substantial influence on the velocity of the reaction products. When operating according to the invention, however, the liquid and gaseous reaction products are passed, mixed together, through the reaction tubes with a high velocity. The length of the reaction zone accordingly is considerably greater which in turn makes the removal of the reaction heat produced considerably simpler. In spite of this the end result of the chlorination is not impaired inasmuch as the high velocities avoid an increased formation of higher chlorinated hydrocarbons. The reaction zone can be further extended by starting with low light intensities at the beginning of the reaction flow and increasing the intensity along the path of flow. The light sources should be arranged at a slight distance from the reaction tube.

The hydrocarbon to be worked must be completely free from oxygen prior to the reaction. This is accomplished by thoroughly blowing nitrogen or other inert gases through the hydrocarbon. Even small quantities of oxygen have a very strong inhibiting action on the chlorine addition. The removal of traces of oxygen may also be effected by previously passing hydrogen chloride, produced during the reaction, through the hydrocarbon.

Hydrocarbon mixtures containing relatively large quantities of unsaturates and alcohols, for example, the products of catalytic carbon monoxide hydrogenation, must be freed from their alcohol and olefine content prior to chlorination, inasmuch as undesired dichlorides are produced from these olefines and alcohols during the chlorination. It is possible to effect the prior removal of the alcohols and olefines by dehydration over aluminum oxide followed by hydrogenation with nickel or cobalt catalysts. This procedure, however, requires relatively high pressures and temperatures and causes a high consumption of hydrogen. Olefine-like and/or alcohol-like hydrocarbons can be freed of these undesired compounds most simply by separating them into fractions containing the same number of carbon atoms and thereafter treating them with zinc chloride and hydrogen chloride in liquid phase, distilling off the alkyl monochlorides produced thereby, chlorinating the remaining saturated hydrocarbons, and returning the hydrogen chloride which escapes for re-cycling to the process. In this manner the initial mixtures which are to be chlorinated can be freed of the disturbing unsaturated and alcoholic portions in an extremely simple and easy manner. The hydrochloric acid produced in the chlorination of the saturated hydrocarbons may be used in connection with the conversion of the olefines and alcohols into chlorides in accordance with the invention. In operating in this manner chlorine is saved and these alcohols and olefines can be converted exclusively into alkyl monochlorides.

For removing the heat of reaction it has been found particularly advantageous to use two glass tubes, one of a smaller diameter, concentrically arranged one within the larger. The hydrocarbon chlorination is effected in the space between the two tubes which is filled with fillers of suitable size. Water or other suitable cooling agents are flowed through the smaller tube. The filler may consist of ceramic material and preferably of glass. It is advantageous to effect the illumination of the reaction tube from the outside so as to avoid additional heating of the reaction mixture by the illuminating body. With sufficient cooling, of course, inner illumination can also be used.

The following examples are given by way of illustration and not limitation, the invention being limited by the appended claims or their equivalents.

*Example 1*

The chlorinating apparatus consisted of a glass tube of a length of 3 meters and an inside diameter of 20 mm. A second glass tube of an inner diameter of 9 mm. was inserted concentrically in said first glass tube. Thermocouples were arranged within it, in order to make temperature measurements. The outer glass tube was surrounded by a cooling jacket through which water flowed. The annular space between the outer and inner tubes was filled with glass rings of a diameter of 3 mm. The entire apparatus was inclined to the horizontal by an angle of about 5°.

As hydrocarbon, there was selected a $C_{10}$ fraction obtained by fractionation of a primary product of carbon monoxide hydrogenation. This $C_{10}$ fraction still contained small amounts of $C_7$ alcohols. It was stirred in an agitator vessel with about 20% of its weight of an aqueous 70% zinc chloride solution at 70 to 80° C., gaseous hydrogen chloride being simultaneously introduced. After the separation of the aqueous catalyst solution and the washing out of the residual hydrochloric acid and zinc chloride, the reaction product was subjected to vacuum distillation, in which, first of all, the $C_7$ monochloride produced from the $C_7$ alcohol, then the saturated $C_{10}$ hydrocarbon, and finally, the $C_{10}$ monochloride produced from the unsaturated $C_{10}$ hydrocarbon were recovered. The saturated $C_{10}$ hydrocarbon was now subjected to chlorination, the hydrogen chloride obtained therefrom serving for the addition reaction with the olefines.

Prior to the chlorination, the $C_{10}$ hydrocarbon was blown-through with nitrogen in a pressure vessel. It was then introduced via a throttle valve into the darkened upper end of the reaction tube. A stream of chlorine was then introduced through a nozzle shortly behind the place of admission of the hydrocarbon, said chlorine being obtained from a gas cylinder via a throttle valve.

80 liters of $C_{10}$ hydrocarbon and 5.8 kgs. of chlorine per hour were introduced into the reaction tube. The outer tube was irradiated by 5 lamps which had a power of 500 watts. Not taking the gaseous phase into consideration, a liquid velocity of 16 cm./sec. was maintained. The highest temperature of the reaction mixture was 65° C. The discharging reaction products had a temperature of approximately 45° C. The discharging gas was practically free of chlorine.

The discharging liquid mixture, consisting of unreacted hydrocarbon and alkyl chlorides, was first of all blown-through with air in order to remove dissolved hydrocarbon. Thereupon, it was subjected to distillation at an absolute pressure of 10 mm. mercury. From this distillation there were obtained 48 kgs. unreacted $C_{10}$ hydrocarbon, 11.4 kgs. $C_{10}$ monochloride and 1.7 kgs. $C_{10}$ polychlorides per hour. Referred to the total quantity of hydrocarbon chlorides, this corresponds to a yield of 89 mol-percent monochloride as compared with a theoretically possible yield of 90.5 mol-percent monochloride.

*Example 2*

The chlorinating apparatus consisted of a transparent quartz-glass tube of a length of 4 meters and an inner diameter of 50 mm. Concentrically within it, there was provided a glass tube having an outer diameter of 35 mm. The space between the outer and inner tubes was filled with glass rings of a diameter of 6 mm. The vertical reaction tube was surrounded by a glass tube of a diameter of 100 mm., which consisted of several sections joined together by rubber sleeves and served, as did the inner tube, for the cooling of the reaction tube. Tube lamps (strip, scaffold or tubular lamps) were arranged in three sides for illumination. The hydrocarbon to be chlorinated was obtained by fractionation of a petroleum heavy-gasoline which had been previously freed of its content of aromatics and had a content of aliphatics of 60% and of naphthenes of 40%. It was introduced via a throttle valve, by means of a pump, into the upper darkened end of the reaction tube. The chlorine admission nozzle was located a short distance behind it. 500 liters of $C_{10}$ hydrocarbon and 36.5 kgs. chlorine were introduced per hour. The hydrocarbon had been previously freed of its oxygen content by blowing hydrogen chloride through it.

Disregarding the gases produced during the reaction, the liquid velocity was 12 cm./sec. The reaction gas discharging with the reaction products was practically free of chlorine. The liquid reaction products were freed of the hydrogen chloride still present by blowing air through them. Thereupon, they were fractionated at an absolute pressure of 10 mm. mercury. From this fractionation, there were obtained 300.5 kgs. unreacted $C_{10}$ hydrocarbons, 71.0 kgs. $C_{10}$ monochloride and 11.3 kgs. $C_{10}$ polychlorides per hour. Referred to the total quantity of alkyl chlorides produced, there were obtained 88.4 mol-percent monochlorides as compared with the theoretically possible quantity of 90.5 mol-percent monochlorides.

The examples show that the method in accordance with the invention gives practically the theoretical mol-ratio of monochlorides to polychlorides. With an addition of 0.1 gram-atom chlorine to each mol of hydrocarbon, one can therefore obtain more than 95 mol-per cent monochlorides. In spite of this, the quantities treated are substantially higher, due to the high liquid velocities used, than in connection with the previously known chlorination processes. A single reaction tube of a length of 4 meters and a free cross-section of only approximately 12 square centimeters makes possible an hourly output of 500 liters. Extremely small quantities of chlorine can be added to each hydrocarbon molecule by the method of the invention, as required for a high yield of alkyl monochlorides, without using excessively large chlorinating apparatus.

When the liquid velocity is used herein, there is meant the liquid velocity disregarding the quantity of gas flowing.

We claim:

1. Method for the production of alkyl monochlorides which comprises establishing a downward path of flow containing filler material, substantially continuously passing a saturated liquid hydrocarbon to be chlorinated and chlorine gas in parallel flow downward through said path of flow in amounts of 0.1 to 0.3 gram-atoms of chlorine for each mol of hydrocarbon at a liquid flow velocity in excess of about 5 cms. per second exclusive of the quantities of gas flowing through, maintaining a temperature along said path of flow below 70° C. and a pressure sufficient to maintain said hydrocarbon in liquid phase, continuously illuminating the reactants along said path of flow, and continuously recovering a high yield of alkyl monochlorides.

2. Method according to claim 1, in which the reactants are passed down said path of flow at a liquid velocity in excess of about 10 cms./sec. exclusive of the quantities of gas flowing through.

3. Method according to claim 1, in which the intensity of said illumination is increased along said path of flow in the flow direction.

4. Method according to claim 1, in which a substantially oxygen free gas is blown through the hydrocarbon prior to passing it down said path of flow to remove the oxygen therefrom.

5. Method according to claim 4, in which said oxygen free gas is at least one member of the group consisting of nitrogen and hydrogen chloride.

6. Method according to claim 1, in which said liquid hydrocarbon is substantially a C–10 fraction.

7. Method according to claim 1, in which said pressure is normal pressure and in which said hydrocarbon is a normally liquid hydrocarbon.

References Cited in the file of this patent

UNITED STATES PATENTS

| Number | Name | Date |
|---|---|---|
| 1,432,761 | Koch | Oct. 24, 1922 |
| 1,954,438 | Britton et al. | Apr. 10, 1934 |
| 2,105,733 | Hass et al. | Jan. 18, 1938 |
| 2,473,162 | McBee et al. | June 14, 1949 |
| 2,530,699 | Humphrey et al. | Nov. 21, 1950 |

OTHER REFERENCES

Hass et al., Industrial and Engineering Chemistry, vol. 27, No. 10, pp. 1190–95.